Dec. 12, 1967     W. F. KING III     3,357,241
FAULT SENSING DEVICE FOR CONTINUOUSLY MOVING WEB
Filed Jan. 25, 1965

Inventor:
Walter Francis King III
By: Spencer & Kaye
Attorneys 3,357,241
FAULT SENSING DEVICE FOR CONTINUOUSLY MOVING WEB
Walter Francis King III, University Park, Pa., assignor to Licentia Patent-Verwaltungs-G.m.b.H., Frankfurt am Main, Germany
Filed Jan. 25, 1965, Ser. No. 427,707
Claims priority, application Germany, Jan. 24, 1964
L 46,874
12 Claims. (Cl. 73—159)

ABSTRACT OF THE DISCLOSURE

A fault sensing device for detecting the presence of unevenness in the surface of web material, including a feeler element which is connected to an elastic means having two spaced-apart leaf springs and means for adjusting the tension thereinbetween. A strain gauge element is attached to one of the two leaf springs for measuring changes in the elongation of the leaf spring resulting from unevenness in the surface of the web material.

---

The present invention relates to a sensing device, and, more particularly, to a sensing device which is especially suited for sensing the presence of folds, knots or the like, in the surfaces of continuously moving webs or sheets of material, such as paper.

There exist photoelectric scanning devices for use in conjunction with moving paper webs. In such devices, light emitted by a light source is reflected onto the paper web by means of a rotating mirror, and a photoelectric receiver or pickup is positioned to pick up light reflected from the surface of the paper web so that a determination can be made as to whether there is any change in the reflected light which itself would be due to the faults in the paper surface. Experience has shown, however, that such photoelectric scanning devices are not at all well suited for determining the presence of folds, especially folds resulting from the material having been squeezed together, knots or kinks, or other faults in the material, especially if these faults are oriented in a certain way. It is, however, important that all such faults be noted and that the proper signal indicating the presence of such faults be given, for otherwise the machinery which handles the webs, such as pressure rollers or the like, are likely to be damaged.

In order to improve the reliability with which such faults can be sensed, there exist, besides the contactless photoelectric scanning equipment, mechanical scanning devices which incorporate mechanical feelers that slide along the surface of the papers. Such feelers are fashioned in the manner of sound pick-up heads and have the inherent drawback that they have differential characteristics, i.e., that they respond only to changes in the surface characteristics due to unevennesses. Yet another disadvantage of such mechanical feelers is that, in practice, it is very difficult to keep the heads free of dust or other foreign particles.

It is, therefore, the primary object of the present invention to provide a device for detecting the presence of unevennesses in the surface of web material, which device overcomes the above-mentioned drawbacks, and, with this object in view, the present invention resides, basically, in a device which comprises support means, elastic means and strain gauge means. The elastic means have two spaced-apart portions one of which portions is secured to the support means and the other of which portions is arranged to be in contact with the surface of the surface of the web material, and the strain gauge means are arranged on the elastic means, intermediate the two portions thereof, for measuring changes in elongation of the elastic means, between the two portions thereof, as the result of unevenness in the surface of the web material.

Additional objects and advantages of the present invention will become apparent upon consideration of the following description when taken in conjunction with the accompanying drawings in which.

Figure 1:
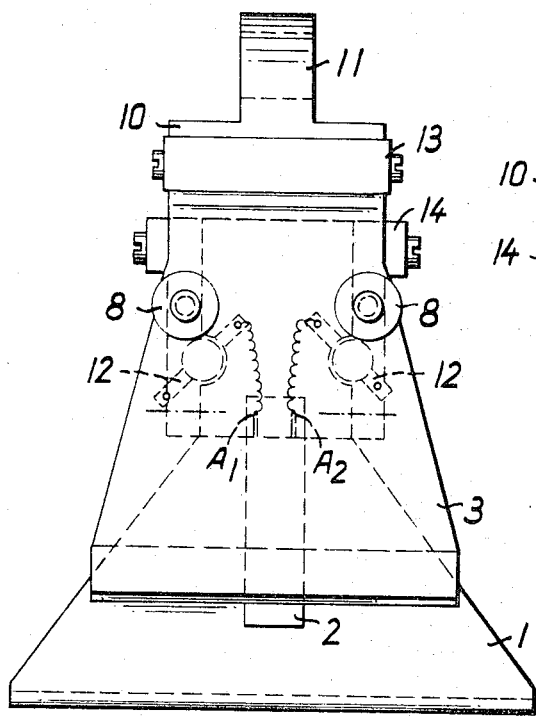
FIGURE 1 is a front view of a sensing device according to the present invention.
Figure 1A:
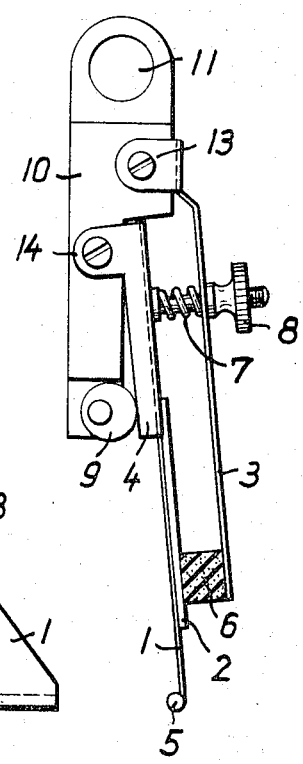
FIGURE 1a is a side view of the sensing device of FIGURE 1.

Referring now to the drawing, the same shows a sensing device according to the present invention, which sensing device comprises elastic means such as a leaf spring 1 at whose lower end portion, as viewed in FIGURES 1 and 1a, there is arranged a scanning or feeler needle 5, this needle being in contact with and sliding along the surface of a moving web of material. This web is not shown in the drawing, but can be imagined to lie in a plane at right angles to the plane of the drawing. The needle 5 may be immovably secured to the leaf spring 1 or it may be rotatably mounted thereon so as to roll over the surface of the web.

The leaf spring 1 is secured at its other end portion to a plate 4 which itself is pivotally mounted on a support 10 by means of a lockable hinge 14. The angular position of the plate 4 with respect to the support 10, and hence the position of the leaf spring 1, and with it the needle 5, with respect to the surface of the web, can be adjusted by means of an eccentric cam 9.

The device comprises a further leaf spring 3 whose upper end, as viewed in FIGURES 1 and 1a, is connected to the support 10 by means of a lockable hinge 13 and whose lower end bears against the leaf spring 1 through the intermediary of a piece 6 of resilient material such as sponge rubber. The leaf spring 3 provides the first-mentioned leaf spring 1 with a certain bias with which the needle 5 is pressed against the surface of the material, as a result of which the sensing movement is damped to a certain extent. This bias can be adjusted by means of one or more setting devices, each comprising a coil spring 7 which is arranged about a threaded stem and whose length and hence tension is regulated by means of an adjusting knob 8 which is threaded onto the stem.

Arranged on the leaf spring 1 is a strain gauge 2 for measuring elongation, the strain gauge having its terminals $A_1$, $A_2$, connected with respective solder terminals 12. The strain gauge is constituted, for example, by a conventional thin resistance wire which is mounted on a carrier and which changes its electric resistance as a function of strain or elongation. Such change in elongation will occur when the needle 5 rides over a fold or the like. A signal, which is derived from the change of resistance of the strain gauge, is then utilized to indicate the fact that the needle has sensed an unevenness of the web.

In practice, the signal can be used to actuate an indicating or marking device, or for actuating a by-pass switch by means of which the portion of the material being sensed is sorted out.

The signal can also be used to obtain information as to the nature of the flaw. For example, the duration of the signal can be used to determine the length of the fold being sensed by the needle, assuming this fold to run at right angles to the leaf spring 1.

The resistance of the strain gauge can be converted into a voltage by means of a suitable differential circuit, e.g., a bridge circuit. In certain cases, the device described above can be modified to incorporate two strain gauges which are both mounted on the leaf spring 1 and which form two of the four arms of a Wheatstone bridge circuit.

Yet another way of converting the resistance into a voltage is to connect the strain gauge in series with a resistor and to apply a constant direct current voltage across the series-circuit. Changes in the voltage across the strain gauge can then be applied to a RC-amplifier.

Very slow changes in the resistance of a strain gauge, such as might be due, for instance, to temperature fluctuations or the like, can be compensated for or suppressed by means of appropriate time constants.

If webs of relatively large widths are to be scanned, a multiple unit, incorporating a plurality of devices such as the one described above can be used. The individual devices can then be positioned over the web as required. To this end, the support 10 is provided with a pivot 11 which can be attached to a guide sleeve which itself may be mounted for movement along a suitable suspension such as a guide rod or tube which is arranged transverse to the web and is common to all of the devices. The individual supports 10 may then be moved into position and, once in position, be suitably secured against inadvertent displacement.

It will be understood that the above description of the present invention is susceptible to various modifications, changes and adaptations, and the same are intended to be comprehended within the meaning and range of equivalents of the appended claims.

What is claimed is:

1. A sensing device for detecting the presence of unevennesses in the surface of web material, comprising, in combination:
   (a) support means;
   (b) elastic means having two spaced-apart leaf spring portions; said elastic means, at one end thereof, being secured to said support means, and, at the other end thereof, being in contact with the surface of the web material; and
   (c) strain gauge means arranged on one leaf spring portion of said elastic means for measuring changes in elongation of said elastic means as the result of unevennesses in the surface of the web material.

2. A sensing device as defined in claim 1, wherein the other of said leaf springs comprises biassing means acting on said one leaf spring for damping the deflection of said one leaf spring under the influence of unevennesses in the surface of the web material.

3. A sensing device as defined in claim 2 wherein one end of said other leaf spring is secured to said support means and the other end engages said one leaf spring intermediate said two ends thereof.

4. A sensing device as defined in claim 3, and further comprising a piece of resilient material interposed between said one leaf spring and said other leaf spring.

5. A sensing device as defined in claim 3, further comprising means for adjusting the bias force which said other leaf spring exerts on said one leaf spring.

6. A sensing device as defined in claim 1 wherein said support means comprise a support and a holder pivotally mounted on said support, said elastic means being secured to said holder.

7. A sensing device as defined in claim 6 wherein said support means further comprise eccentric means for adjusting the position of said holder with respect to said support.

8. A sensing device as defined in claim 1 wherein one end of said one leaf spring contacts the web of material.

9. A sensing device as defined in claim 8 wherein said one leaf spring, at said end thereof at which it contacts the web of material, is provided with a sensing needle.

10. A sensing device as defined in claim 1 wherein said strain gauge comprises a wire which extends in the direction between said two ends of said one leaf spring and which changes its resistance as a function of elongation.

11. A sensing device for detecting the presence of unevennesses in the surface of web material, comprising, in combination:
    (a) a support;
    (b) a holder pivotally mounted on said support;
    (c) eccentric cam means mounted on said support and engaging said holder for enabling the position of said holder to be regulated with respect to said support;
    (d) elastic means having two spaced-apart leaf spring portions, one end of one of said leaf springs being secured to said holder and the other end thereof being positioned to contact the surface of the web material; and
    (e) at least one strain gauge arranged on said one leaf spring and extending intermediate said two ends thereof for measuring changes in elongation of one said leaf spring between said two ends thereof as the result of unevennesses in the surface of the web material.

12. A sensing device for detecting the presence of unevennesses in the surface of web material, comprising, in combination:
    (a) a support;
    (b) a holder pivotally mounted on said support;
    (c) eccentric cam means mounted on said support and engaging said holder for enabling the position of said holder to be regulated with respect to said support;
    (d) a leaf spring having two spaced-apart end portions, one of said end portions of said leaf spring being secured to said holder and the other end portion of said leaf spring being positioned to contact the surface of the web material;
    (e) at least one strain gauge arranged on said leaf spring and extending intermediate said two end portions thereof for measuring changes in elongation of said leaf spring between said two end portions thereof as the result of unevennesses in the surface of the web material.
    (f) leaf spring means for damping the deflection of the first-mentioned leaf spring under the influence of unevennesses in the surface of the web material, said leaf spring means including a further leaf spring one end of which is secured to said support and the other end of which is arranged in the region intermediate said two end portions of said first-mentioned leaf spring, and a piece of foam rubber interposed between the two leaf springs; and
    (g) means for adjusting the force which said further leaf spring exerts on said first-mentioned leaf spring, said adjusting means comprising a coil spring interposed between said further leaf spring and said holder, and an adjusting knob for varying the length of said coil spring.

References Cited

UNITED STATES PATENTS

| 2,487,681 | 11/1949 | Weisselberg. |
| 2,509,986 | 5/1950 | Neff _____ 33—172 |
| 3,037,381 | 6/1962 | Grant et al. _____ 73—159 |
| 3,074,175 | 1/1963 | Ludlam _____ 73—88.5 |

DAVID SCHONBERG, *Primary Examiner.*